(12) United States Patent
Kumar et al.

(10) Patent No.: US 11,501,646 B2
(45) Date of Patent: Nov. 15, 2022

(54) COORDINATING VEHICLE PLATOONING USING V2X ASSISTANCE

(71) Applicant: QUALCOMM Incorporated, San Diego, CA (US)

(72) Inventors: Akash Kumar, Hyderabad (IN); Amit Jain, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 100 days.

(21) Appl. No.: 17/064,299

(22) Filed: Oct. 6, 2020

(65) Prior Publication Data

US 2022/0108618 A1 Apr. 7, 2022

(51) Int. Cl.
| | |
|---|---|
| *G08G 1/00* | (2006.01) |
| *H04W 4/40* | (2018.01) |
| *G08G 1/16* | (2006.01) |
| *H04W 48/04* | (2009.01) |
| *H04W 48/06* | (2009.01) |
| *H04W 48/14* | (2009.01) |

(52) U.S. Cl.
CPC ............. *G08G 1/22* (2013.01); *G08G 1/161* (2013.01); *H04W 4/40* (2018.02); *H04W 48/04* (2013.01); *H04W 48/06* (2013.01); *H04W 48/14* (2013.01)

(58) Field of Classification Search
CPC ........... G08G 1/22; G08G 1/161; H04W 4/40; H04W 48/04; H04W 48/06; H04W 48/14
See application file for complete search history.

(56) References Cited

U.S. PATENT DOCUMENTS

| | | | | |
|---|---|---|---|---|
| 11,181,929 B2* | 11/2021 | Kelkar | .................... | H04W 4/08 |
| 11,242,051 B1* | 2/2022 | Konrardy | ......... | G08G 1/096791 |
| 2016/0357187 A1* | 12/2016 | Ansari | ................... | G06V 20/58 |
| 2019/0079659 A1* | 3/2019 | Adenwala | .............. | H04W 4/44 |

(Continued)

FOREIGN PATENT DOCUMENTS

| | | |
|---|---|---|
| EP | 3690844 A1 | 8/2020 |
| WO | 2020034052 A1 | 2/2020 |
| WO | 2020035249 A1 | 2/2020 |

OTHER PUBLICATIONS

International Search Report and Written Opinion—PCT/US2021/049860—ISA/EPO—dated Jan. 4, 2022.

*Primary Examiner* — Ajay Cattungal
(74) *Attorney, Agent, or Firm* — Patterson & Sheridan, L.L.P

(57) ABSTRACT

Certain aspects of the present disclosure provide techniques for coordinating vehicle platooning with V2X assistance. The techniques generally include: a first vehicle associated with a source UE transmitting a request to a base station to join a vehicle platoon. The request indicates at least one of: an occupancy parameter of a first vehicle associated with the source UE; an autonomy level of the first vehicle; or a travel preference parameter. The occupancy parameter may include a number of passengers, seating positions of passengers, and other occupancy information pertaining safety and prioritization. The autonomy level enables vehicles of similar autonomy to form a platoon that optimizes headways, thus minimizing fuel consumption due to air resistance. The travel preference parameter may include a preferred speed of the source UE. The source UE may receive a response message indicating confirmation that the first vehicle is allowed to join the vehicle platoon.

43 Claims, 10 Drawing Sheets

(56) References Cited

U.S. PATENT DOCUMENTS

2019/0220037 A1* 7/2019 Vladimerou ......... G05D 1/0088
2019/0349719 A1* 11/2019 Pattan ..................... H04W 4/08
2020/0342766 A1* 10/2020 Gundavelli .......... G05D 1/0295
2021/0264793 A1* 8/2021 Shuman ................ H04W 4/023

* cited by examiner

COORDINATING VEHICLE PLATOONING USING V2X ASSISTANCE

BACKGROUND

Field of the Disclosure

Aspects of the present disclosure relate to wireless communications, and more particularly, to techniques for coordinating vehicle platooning.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include coordinating vehicle platoons (of vehicles associated with UEs communicating with each other) based on parameters over occupancy, autonomy level, safety, efficiency, and priority.

Certain aspects provide a method for wireless communication performed by a source user equipment (UE). The method generally includes: transmitting a request to a base station to join a vehicle platoon, wherein the request indicates at least one of: an occupancy parameter of a first vehicle associated with the source UE; an autonomy level of the first vehicle; or a travel preference parameter. The method further includes receiving a response message indicating confirmation that the first vehicle is allowed to join the vehicle platoon.

Certain aspects provide a method for wireless communication performed by a platoon UE. The method generally includes: receiving a request for a source vehicle associated with a source UE to join a vehicle platoon to which a vehicle associated with the platoon UE is a member, wherein the request indicates at least one of: an occupancy parameter of a source vehicle; an autonomy level of the source vehicle; or a travel preference parameter of the source vehicle. The method further includes transmitting a message indicating confirmation that the source vehicle is allowed to join the vehicle platoon.

Certain aspects provide a method for wireless communication performed by a network entity. The method generally includes: receiving a request from a source UE associated with a source vehicle to join a vehicle platoon, wherein the request indicates at least one of: an occupancy parameter of a source vehicle; an autonomy level of the source vehicle; or a travel preference parameter of the source vehicle. The method further includes selecting, based at least on information in the request, a platoon suitable for the source UE and forwarding the request to a target UE of the selected platoon.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
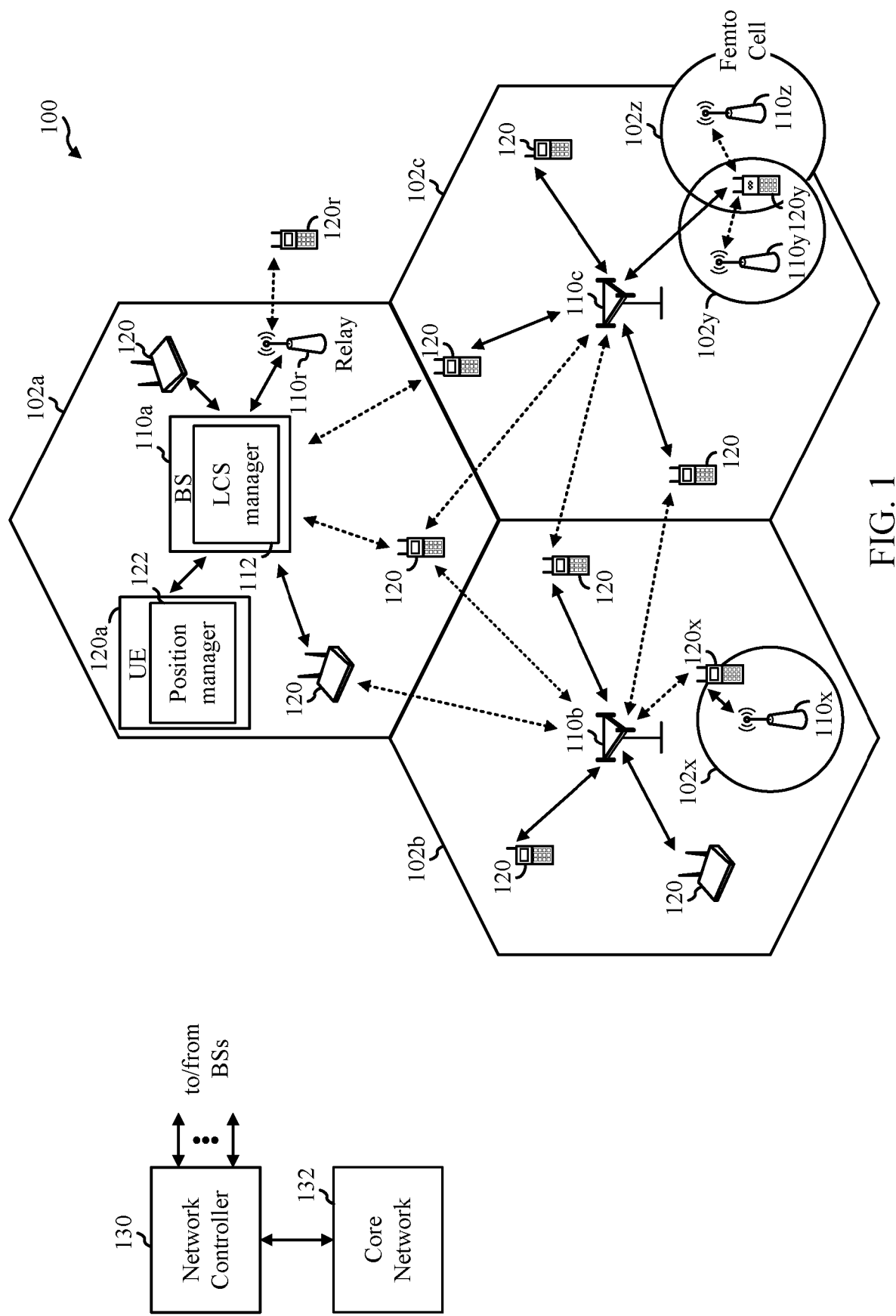
FIG. 1 is a block diagram conceptually illustrating an example wireless communication network, in accordance with certain aspects of the present disclosure.

Aspects of the present disclosure provide apparatus, methods, processing systems, and computer readable mediums for coordinating vehicle platooning.

Vehicle platooning is one of numerous features of self-driving or assisted driving vehicles. A vehicle platoon generally refers to a group of vehicles behaving as one, traveling safely and closely together at high speeds with continuous intercommunication. Platooning may provide various benefits. For example, in some cases, the close distance between vehicles may improve fuel economy by reducing air resistance.

On the other hand, the close distance poses challenges to reduced reaction time in accidents, as well as limiting space available for new vehicles to join the platoon. The present disclosure provides various techniques to address such challenges, by coordinating vehicle platooning and allowing new vehicles to join a platoon based on various parameters, such as ones that are related to efficiency and safety.

Vehicles may be associated with UEs using different methods of communications, such as direct physical connections, near-field communications, among others. Vehicles themselves may include operating systems that enable themselves being standalone UEs. The UEs associated with the vehicles or the vehicles themselves may connect with a network via uplinks and downlinks, and connect with each other via sidelinks.

Among various sidelink communication standards, Vehicle-to-everything (V2X) standards (further discussed below in relation to FIGS. 4A and 4B) enable vehicles to support fully autonomous driving and advanced driver assistance systems (ADAS). In vehicle platooning, V2X is also used to aid and provide efficient and smooth vehicular movements through mutual interaction and co-ordination, such as specifying positions, distances, and speeds, in relation to other vehicles in the platoon. Vehicle platooning is an important aspect discussed in V2X standards.

In existing V2X standards, however, consideration for platoon formation is limited to aspects such as a common destination or highway exit. That is, when a new vehicle (also known as a source vehicle) requests joining a platoon, a platoon control system (PCS) would only consider and suggest platoons based on such limited consideration. The techniques disclosed herein include additional considerations that improve platooning efficiency and safety. For example, occupancy situations and autonomy levels of vehicles are used in selecting platoons and determining the platoons' lanes, speeds, and headways, among other operation conditions.

The following description provides examples of coordinating vehicle platooning, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100, such as a New Radio (NR) or 5G network, in which aspects of the present disclosure may be performed.

For example, one or more BSs 110 may ensure that one or more UEs 120 can have secure and reliable sidelink communications to support or coordinate vehicle platooning and/or autonomous operations. In some examples disclosed, the BS 110 may be a platoon control system (PCS); the UEs 120 may be associated with a source vehicle or a lead vehicle of a platoon. In general, the UE 120 may be configured to perform operations 700 of FIG. 7 and operations 800 of FIG. 8, while the BS 110 may be configured to perform operations 900 of FIG. 9.

As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces. The wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
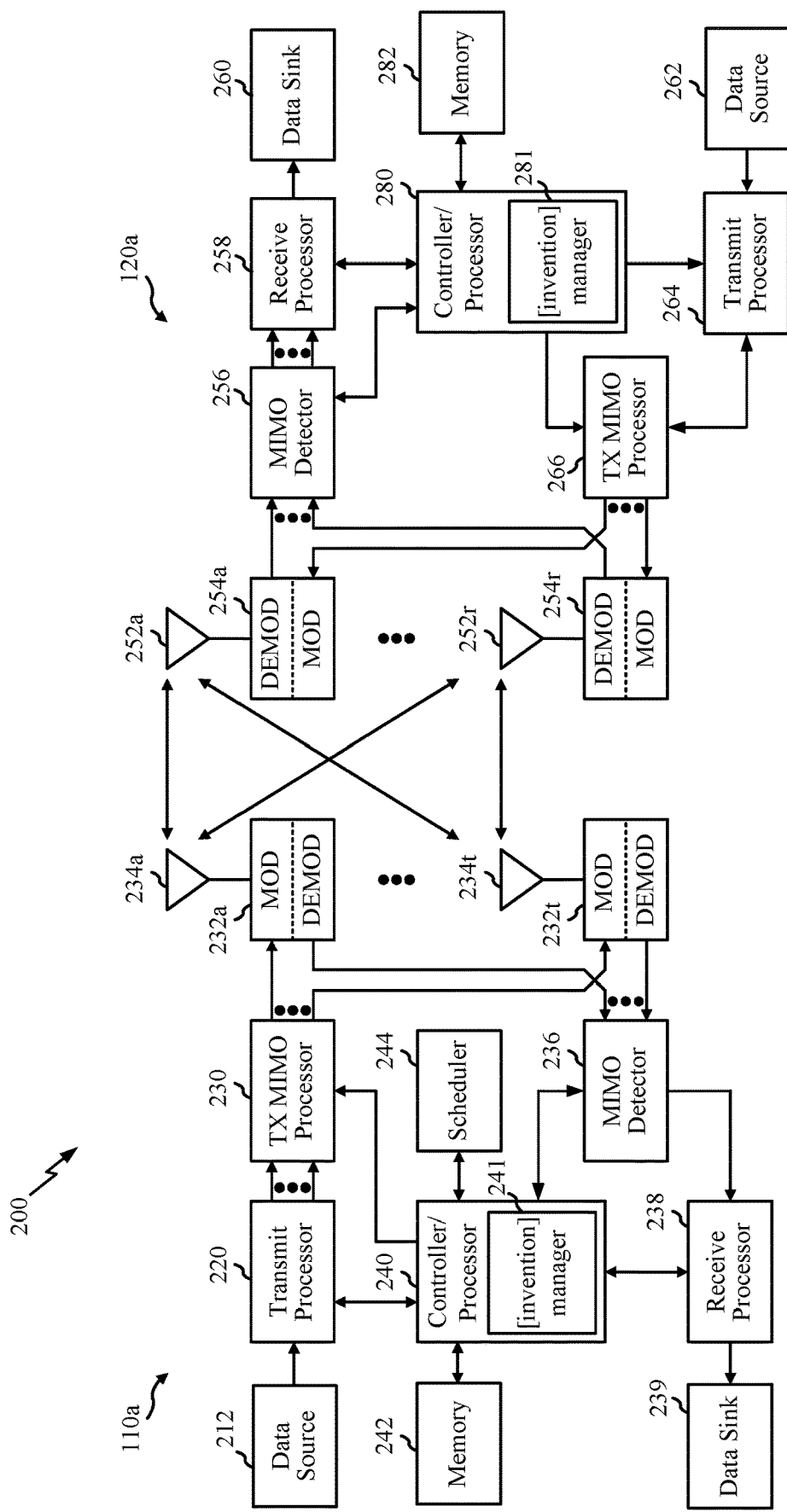
FIG. 2 is a block diagram conceptually illustrating a design of an example a base station (BS) and user equipment (UE), in accordance with certain aspects of the present disclosure.

FIG. 2 illustrates example components of BS 110a and UE 120a (one example of the BS 110 and the UE 120 depicted in FIG. 1), which may be used to implement aspects of the present disclosure. For example, antennas 252a, processors 266, 258, 264, and/or controller/processor 280 of the UE 120a may be configured to perform (or cause UE 120a to perform) operations 700 or 800 of respective FIG. 7 or 8; and/or antennas 234a, processors 220, 260, 238, and/or controller/processor 240 of the BS 110 may be configured to perform (or cause BS 110 to perform) operations 900 of FIG. 9, for coordinating vehicle platooning.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
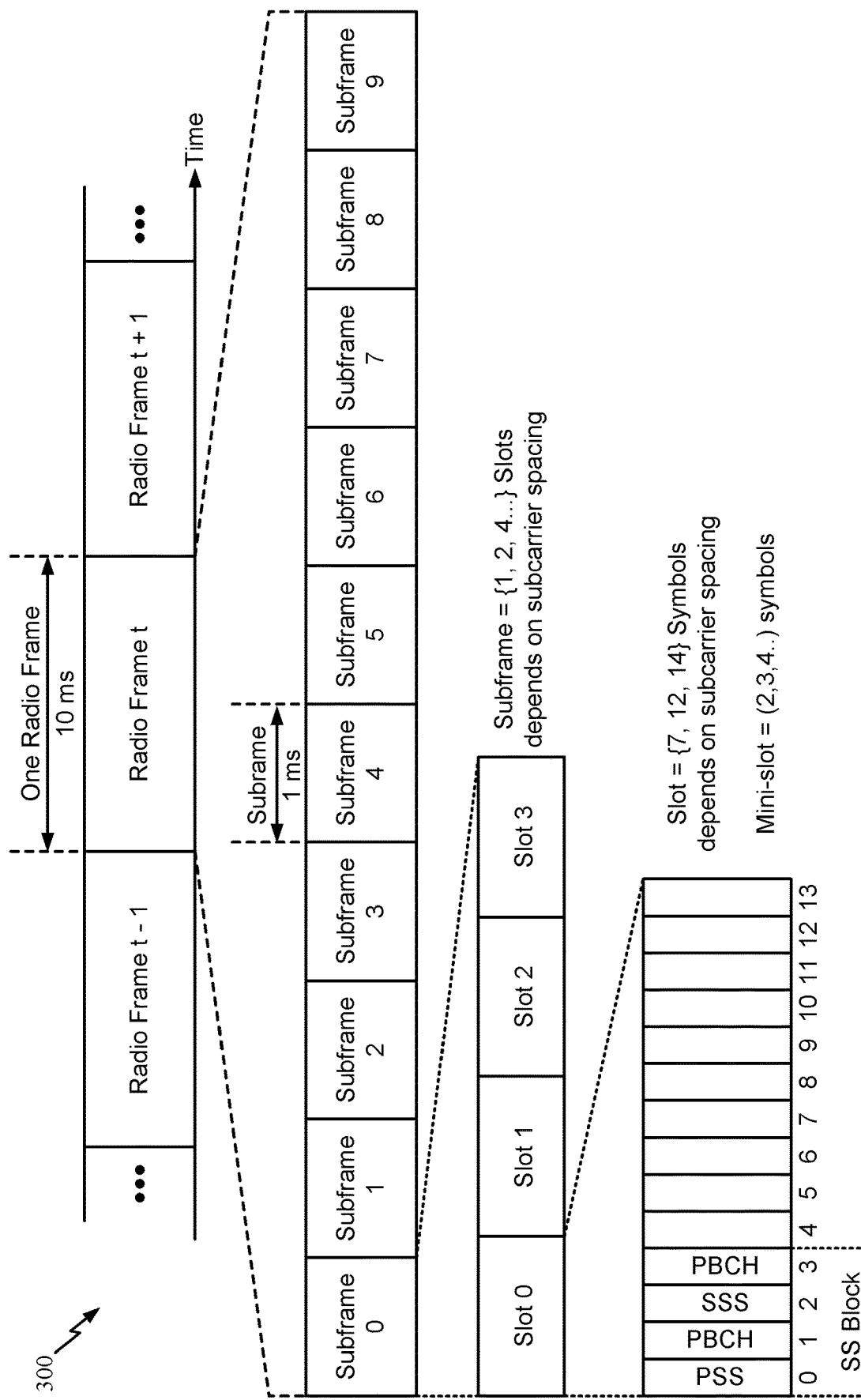
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 4:
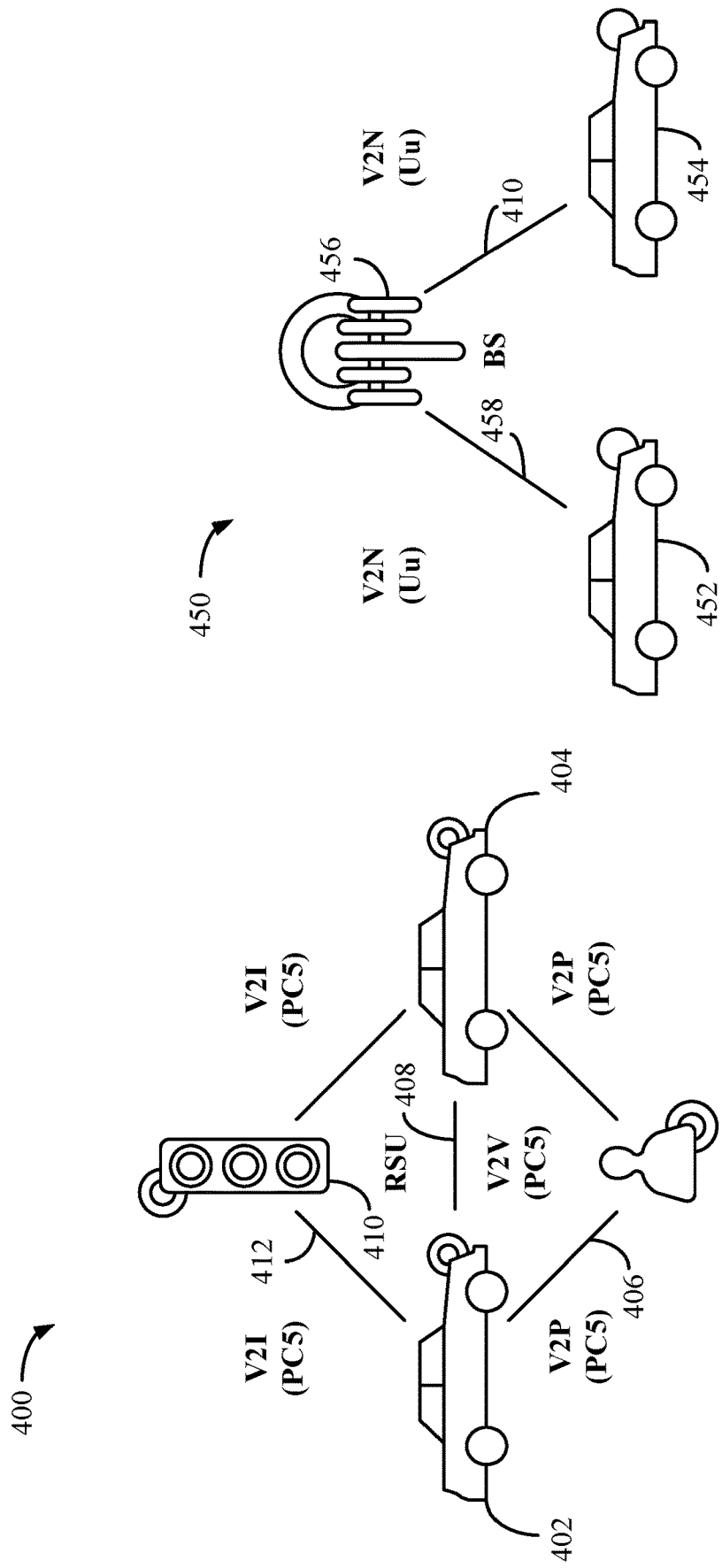
FIG. 4A and FIG. 4B show diagrammatic representations of example vehicle to everything (V2X) systems, in accordance with certain aspects of the present disclosure.

FIG. 4A and FIG. 4B show diagrammatic representations of example V2X systems, in accordance with some aspects of the present disclosure. For example, the vehicles shown in FIG. 4A and FIG. 4B may communicate via sidelink channels and may perform sidelink CSI reporting as described herein.

The V2X systems, provided in FIG. 4A and FIG. 4B provide two complementary transmission modes. A first transmission mode, shown by way of example in FIG. 4A, involves direct communications (for example, also referred to as sidelink communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, roadside service unit 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 110a), that sends and receives information to and from (for example, relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may also be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Aspects of the disclosure relate to sidelink communications, such as cellular-vehicular-to-anything (C-V2X) communications. C-V2X can offer vehicles low-latency V2V, V2I, and V2P communication. C-V2X networks can operate without cellular infrastructure support. For example, C-V2X communication allows direct communication between two UE devices, without transmissions through the BS, functioning by continuous monitoring and decoding of other UE devices. In C-V2X, vehicles can autonomously select their radio resources. For example, the vehicles may select resources, such as semi-persistent scheduling (SPS) resources, according to an algorithm. The algorithm may be a resource allocation algorithm specified by the 3GPP wireless standards.

Current 3GPP C-V2X design targets deployment in a licensed spectrum, either by deployment in a shared, licensed cellular band or by deployment in a dedicated intelligent transportation system (ITS) spectrum. In the licensed spectrum, the spectrum may be assigned exclusively to operators for independent usage. Licensed spectrum may either be shared or dedicated. Shared licensed spectrums provide bandwidth up to a specified level and the bandwidth is shared among all subscribers. Therefore, in a licensed cellular band, a C-V2X system shares uplink spectrum in the cellular network. On the other hand, dedicated internet spectrum provides guaranteed bandwidth at all times, thereby providing spectrum exclusivity when the C-V2X design is deployed in a dedicated ITS spectrum.

ITSs have been developed for decades to support a wide variety of safety-critical and traffic-efficient applications. Under current FCC rules, the 5.9 GHz band is reserved for dedicated short-range communication (DSRC), which facilitates both V2V and V2I communications.

Other countries and regions have also allocated spectrums around 5.9 GHz to V2X communications; however, dedicated spectrums may not be guaranteed in all locations due to spectrum scarcity. Spectrum scarcity has emerged as a primary problem encountered when trying to launch new wireless services in some regions. The effects of this scarcity have led some locations to allocate spectrums for LTE V2X only, leaving allocated spectrum unavailable for NR V2X. 3GPP Release 16 includes specification for 5G NR C-V2X which targets advanced V2X use cases, such as autonomous driving. Rel-16 5G NR C-V2X goes beyond technology that targets basic safety, by adding direct multicast communication technology for advanced safety, increased situational awareness, energy savings, and faster travel time.

In some cases, deployment of C-V2X communications involves deployment in an unlicensed spectrum. Unlicensed spectrum refers to radio frequency bands in which technical rules are specified for both the hardware and deployment methods of radio systems such that the band is open for shared use by an unlimited number of unaffiliated users. In unlicensed spectrum, the spectrum may be available for non-exclusive usage subject to some regulatory constraints (e.g., restrictions in transmission power).

In an unlicensed spectrum, a minimum channel bandwidth may be specified in accordance with regional regulations, and any technological device may transmit in a bandwidth greater than the specified minimum channel bandwidth. For example, in some regions the minimum channel bandwidth may be set at 5 megahertz (MHz). There exists a wide range of unlicensed spectrums available from 5 gigahertz (GHz) to 6 GHz (e.g., Unlicensed National Information Instructure 3 (U-NII-3) operating between 5.725 GHz and 5.850 GHz or U-NII-4 operating between 5.850 GHz and 5.925 GHz). As used herein, the 5 GHz unlicensed spectrum, also referred to as the U-NII band, comprises the frequency range between 5150 MHz and 5925 MHz. The 6 GHz unlicensed spectrum potentially comprises the frequency range from 5925 MHz up to 7125 MHz.

In contrast with most licensed assignments of spectrum use rights, devices or systems operating on an unlicensed basis enjoy no regulatory protection against interference from other licensed or unlicensed users in the band. Currently, the unlicensed spectrum may be utilized by Wireless Local Area Networks (WLAN), such as the ones that are based on IEEE 801.11a/g/n/ac technologies, which are also referred to as Wi-Fi systems. For example, a Wi-Fi device may transmit, for example, in a channel bandwidth of 20 MHz, 80 MHz, 160 MHz, or any other channel bandwidth above 5 MHz.

C-V2X communications deployed in an unlicensed spectrum may operate in either a distributed or a centralized manner. In distributed C-V2X, UEs communicate independently without the assistance of a central node (e.g., a BS) scheduling transmissions between the UEs. In centralized C-V2X, a central node controls and assists with sidelink communications.

Although continuous monitoring may help to effectuate sidelink communication, UEs in an unlicensed spectrum may be incapable of meeting these demands. Continuous monitoring of all carriers/frequencies for potential sidelink transmission may be an unrealistic expectation when a UE is deployed in an unlicensed spectrum due to the wide range of available spectrums (e.g., U-NII-3 or U-NII-4) in the unlicensed band coupled with the band's limited capability.

Accordingly, capability of the UE to transmit and receive in a limited number of carriers (e.g., frequencies) known to all UEs is beneficial to reduce the UE's burden of monitoring all carriers within in an unlicensed band. For example, this burden may be alleviated where UEs have common understanding of carrier(s) used for C-V2X communication. However, statically limiting C-V2X communication to a specific unlicensed carrier may lead to sub-optimal performance, such as an increased probability of interference with other technologies within the band (other technologies may access the unlicensed spectrum as long as they comply with regulatory requirements).

Example Coordinating Vehicle Platooning with V2X Assistance

Aspects of the present disclosure provide techniques for coordinating vehicle platooning with V2X assistance. As noted above, vehicle platooning may substantially increase fuel economy, reduce road congestion, improve safety, and utilize certain level of driving autonomy to allow passengers to be productive during commute. Aspects of the present disclosure may be used to incorporate various parameters in determining platoon formation (e.g., allowing for a source UE associated with a source vehicle to join a selected platoon). The various parameters may include a number of passengers, seating positions of passengers, and other occupancy information pertaining safety and prioritization. The autonomy level enables vehicles of similar autonomy to form a platoon that optimizes headways, thus minimizing fuel consumption due to air resistance. The travel preference parameter may include a preferred speed of the source UE. The source UE may receive a response message indicating confirmation that the first vehicle is allowed to join the vehicle platoon.

Figure 5:
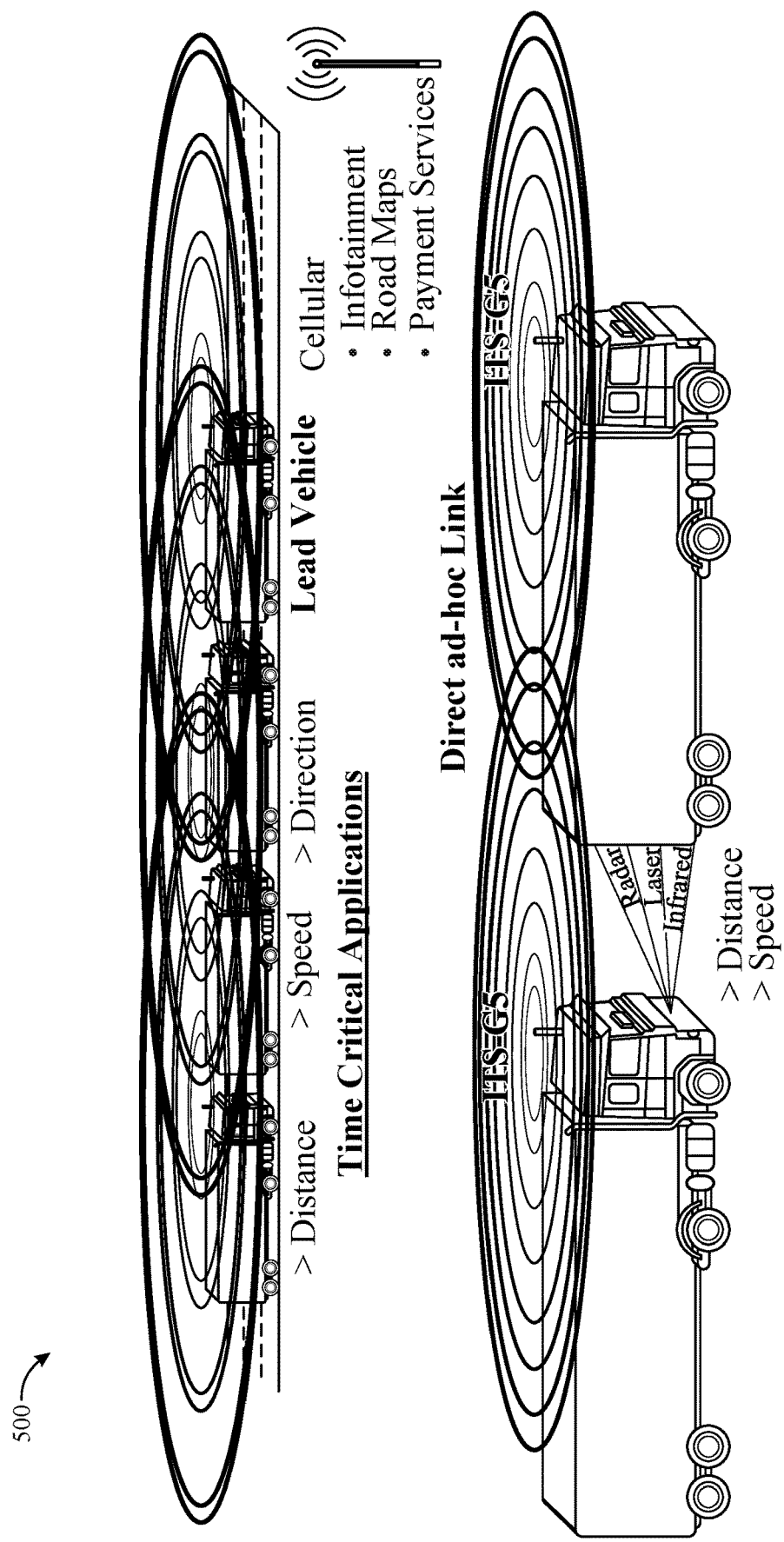
FIG. 5 is a schematic illustration of vehicle platooning, in accordance with aspects of the present disclosure.

FIG. 5 is a schematic illustration 500 of vehicle platooning, in accordance with aspects of the present disclosure. As shown, the vehicle platoon may include a lead vehicle (also referred to as an anchor vehicle, or a platoon UE). The lead vehicle constantly communicates with other member vehicles in the platoon, as indicated by the wave signals. The lead vehicle may determine the travel route, traveling speeds and acceleration, headway (i.e., distances between vehicles in succession), and other operation details. The lead vehicle and each member vehicle of the platoon may include various onboard sensors and processing units to enable a level of driving autonomy or assistance.

For example, the member vehicles need not be fully autonomous to join the platoon, as some of the sensing, control, or determination operations may be distributed among vehicles in the platoon. Such coordination is achieved through the communications among the platoon vehicles and communications with platoon control systems (PCS) illustrated as the cellular base station. In some cases, the PCS provides, via the cellular network, infotainment, road maps, payment services, and other information services in addition to the platooning coordination. The communications between member vehicles in the platoon may be established using direct ad-hoc link, such as V2V PC5 interface 408 in FIG. 4A.

Each member vehicle of the platoon may include an onboard computer or a processing unit, configured to receive and transmit data via the direct ad-hoc link. The data may include measurements from various onboard sensors, including at least one of a radar, laser, or infrared sensor for detecting vehicle to vehicle distance, speeds, and other driving information for automated driving.

Figure 6:
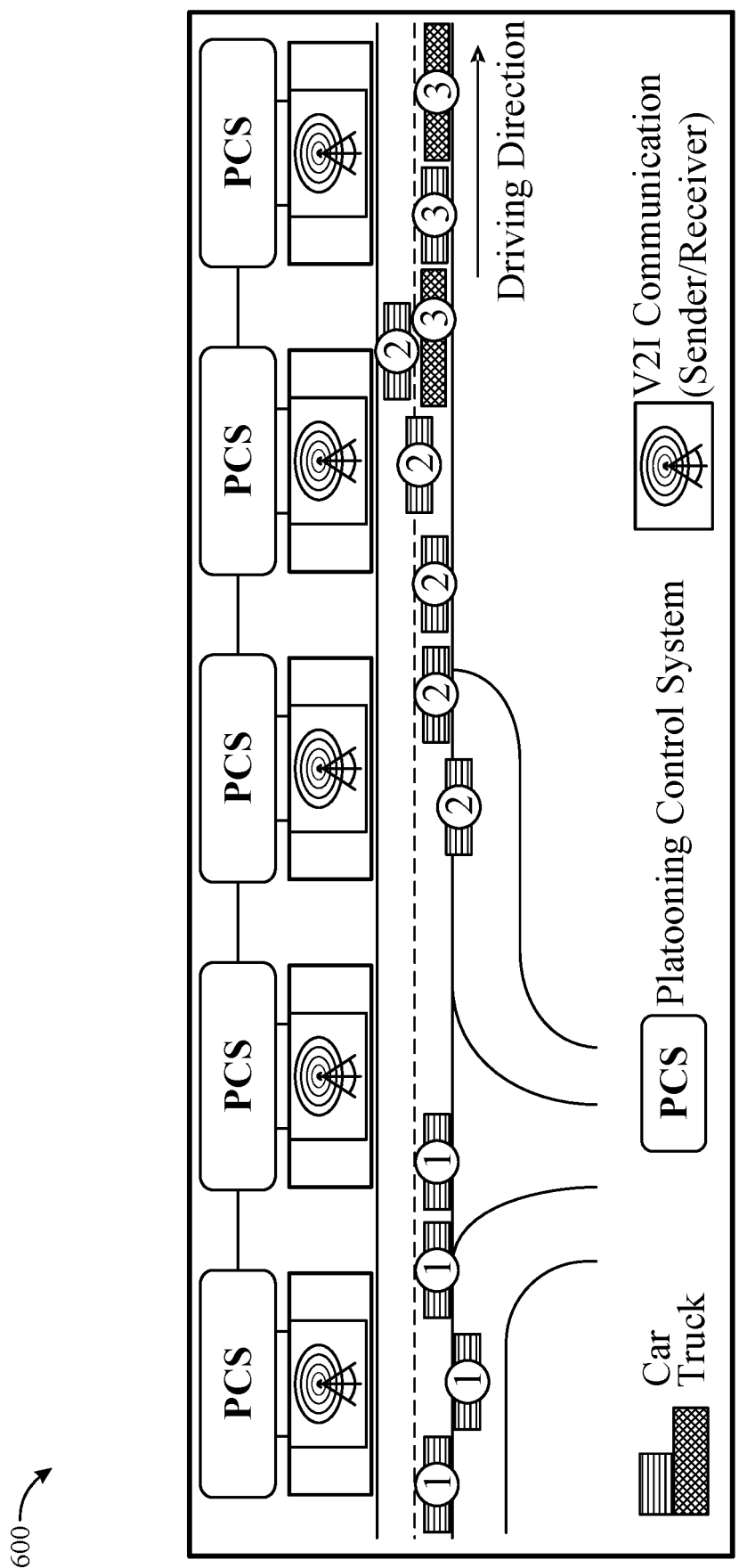
FIG. 6 is a schematic illustration of coordinating multiple vehicle platoons, in accordance with aspects of the present disclosure.

FIG. 6 is a schematic illustration of coordinating multiple vehicle platoons (three platoons: platoon 1, platoon 2, and platoon 3 shown), in accordance with aspects of the present disclosure. As shown, because the member vehicles in a platoon can accelerate or decelerate simultaneously without human reaction delays, platooning enables configuring and maintaining a minimal distance or headway between moving vehicles at high speeds. In some examples, a source vehicle may broadcast a request (e.g., to the PCS and/or the lead vehicle) to join a platoon that shares the same destination information, vehicle dimension, and other information. In response to the request, the platoon or the lead vehicle may accept the request and notify the source vehicle with a confirmation. Dynamically based on the destination information, the source vehicle position within the platoon may be adjusted in preparation for the source vehicle to leave the platoon. While leaving the platoon, similar handshaking with the PCS or the lead vehicle may be performed.

As shown in FIG. 6, the numerous PCS installations provide V2I communication to the platoons nearby. The three platoons 1, 2, and 3 show different driving scenarios. In platoon 1 of four light vehicles (e.g., cars), one vehicle may be requesting to leave the platoon and exit the highway. In platoon 2 of five light vehicles, one vehicle joins the platoon at the end from a roadway entrance, while the lead vehicle changes to the passing lane to overtake platoon 3. In platoon 3 of three mixed vehicles, two trucks and a car form the platoon and are distanced close to each other. Therefore, the communication among the vehicles and with the PCS enables safety operation of leaving, joining, lane changing, and cruising of platoons of different vehicles.

Aspects of the present disclosure provide techniques for coordinating vehicle platooning with V2X assistance. Vehicles in the platoon may be associated with UEs that are C-V2X capable or the vehicles themselves may be equipped with telematics systems with C-V2X capable modems. A source UE (e.g., a wireless device within a vehicle) may transmit a request to a base station to join a vehicle platoon. The request may indicate at least one of: an occupancy parameter of the first vehicle associated with the source UE; an autonomy level of the first vehicle; or a travel preference parameter. Upon approval, the source UE may receive a message indicating confirmation that the source vehicle is allowed to join the platoon.

Figure 7:
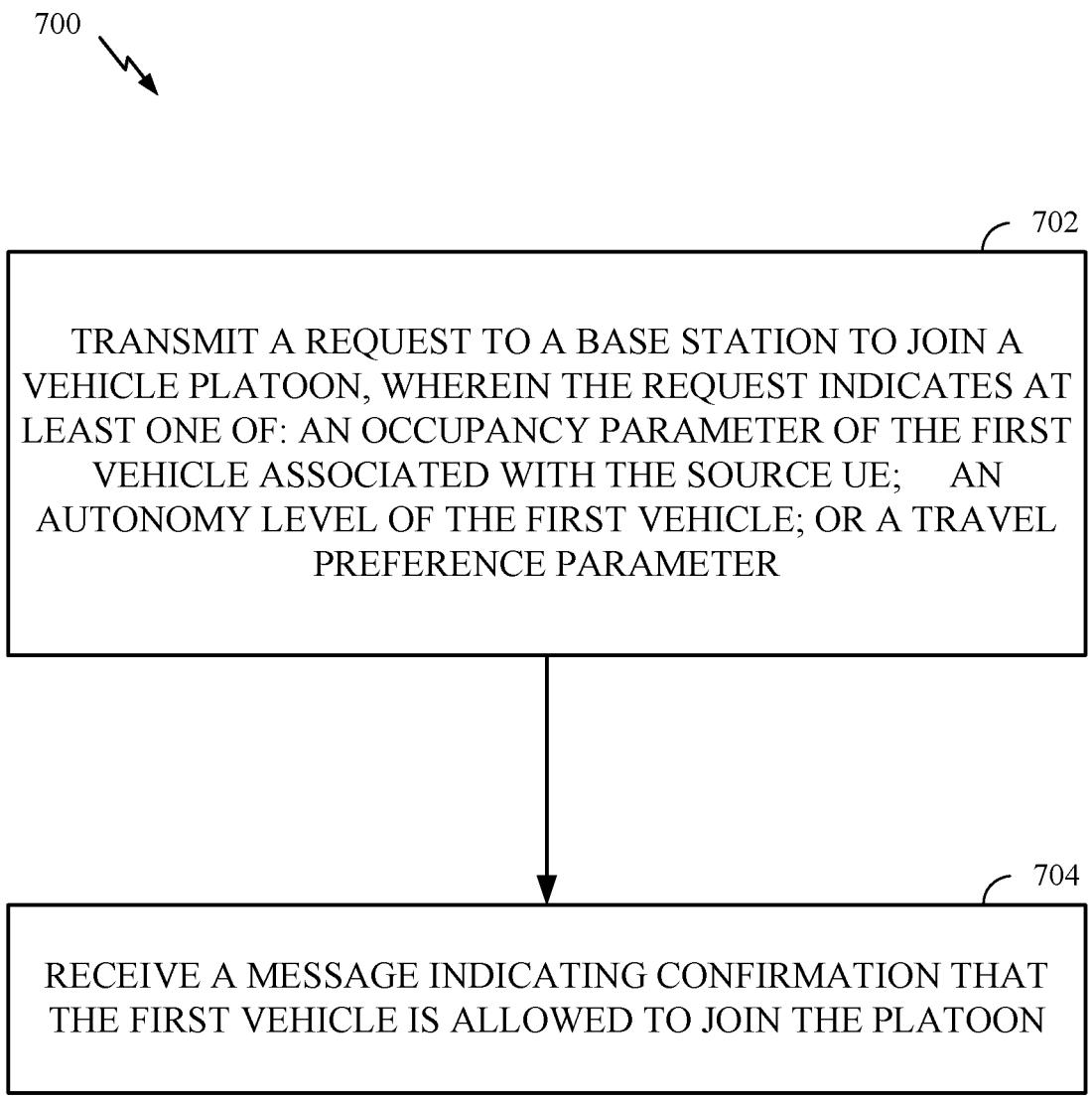
FIG. 7 is a flow diagram illustrating example operations for wireless communication by a source UE, in accordance with certain aspects of the present disclosure.

FIG. 7 is a flow diagram illustrating example operations 700 for wireless communication by a source UE or a UE associated with a first vehicle requesting to join a platoon, in accordance with certain aspects of the present disclosure. The operations 700 may be performed, for example, by a source UE (e.g., the UE 120a in the wireless communication network 100). The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 begin, at 702, by transmitting a request to a base station to join a vehicle platoon. The request may indicate at least one of: an occupancy parameter of the first vehicle associated with the source UE; an autonomy level of the first vehicle; or a travel preference parameter.

At 704, the source UE receives a message indicating confirmation that the first vehicle is allowed to join the platoon.

Figure 8:
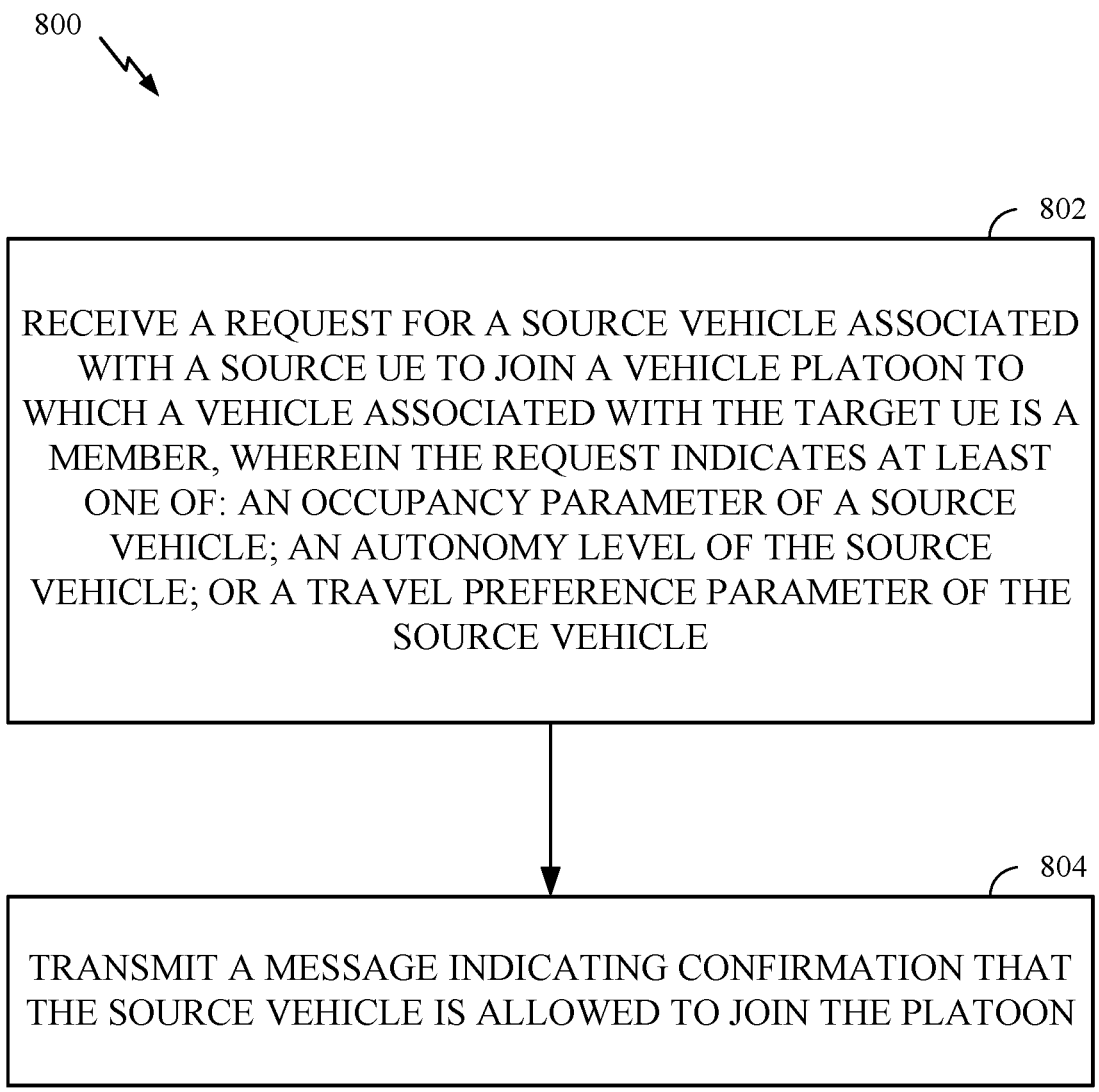
FIG. 8 is a flow diagram illustrating example operations for wireless communication by a target UE, in accordance with certain aspects of the present disclosure.

FIG. 8 is a flow diagram illustrating example operations 800 for wireless communication that may be considered complimentary to the operations 700 For example, operations 800 may be performed, by a lead vehicle/platoon UE receiving and responding to a request from a UE performing operations 700 of FIG. 7. The operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 800 begin, at block 802, by receiving a request for a source vehicle associated with a source UE to join a vehicle platoon to which a vehicle, such as a lead vehicle or anchor vehicle associated with the target UE, is a member. The request may indicate at least one of: an occupancy parameter of the first vehicle associated with the source UE; an autonomy level of the first vehicle; or a travel preference parameter.

At block 804, operations 800 continue by transmitting a message indicating confirmation that the source vehicle is allowed to join the platoon.

Figure 9:
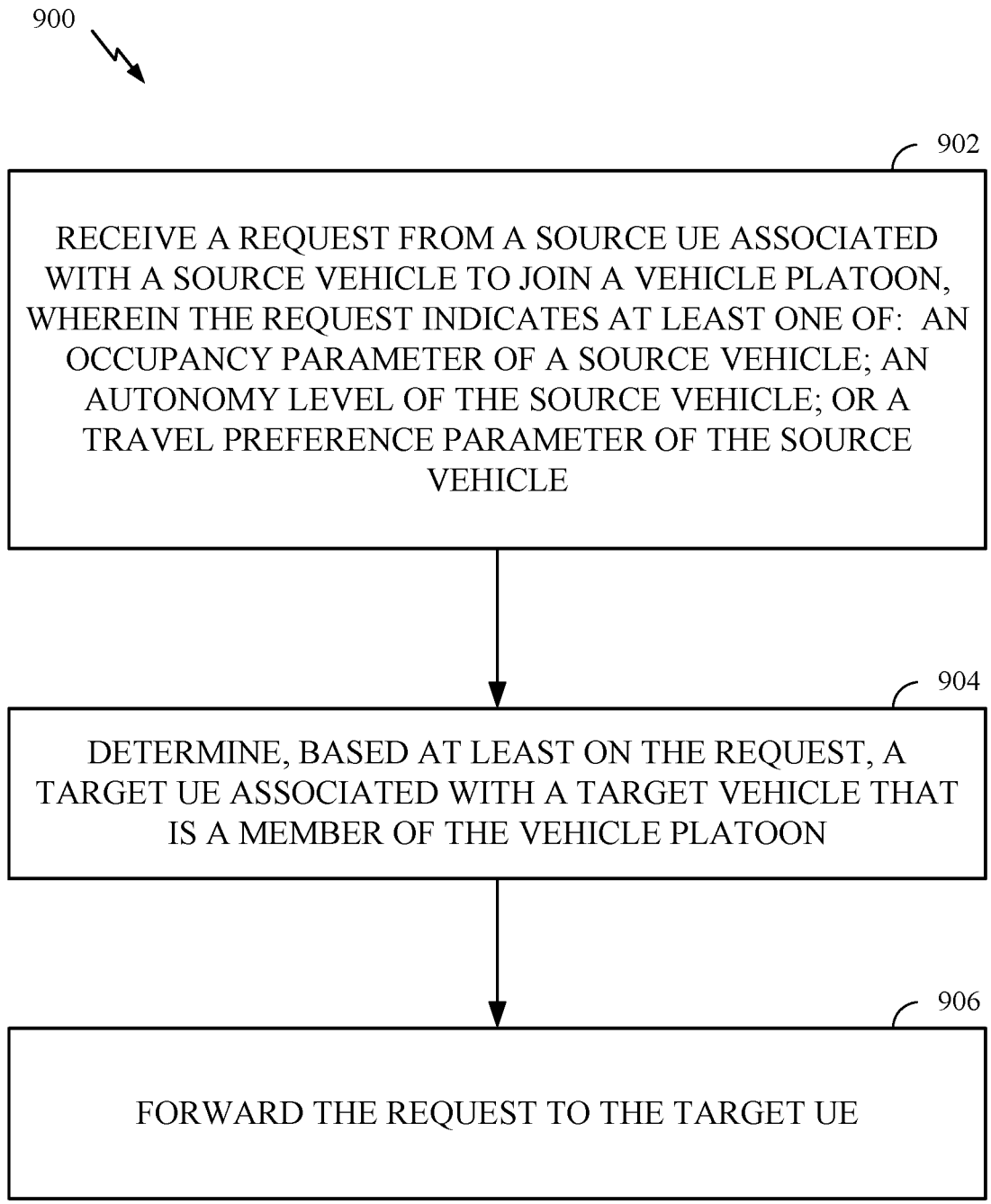
FIG. 9 is a flow diagram illustrating example operations for wireless communication by a BS, in accordance with certain aspects of the present disclosure.

FIG. 9 is a flow diagram illustrating example operations 900 for wireless communication by a network entity, such as a PCS, in accordance with certain aspects of the present disclosure. The operations 900 may be performed, for example, by a BS (e.g., the BS 110a in the wireless communication network 100, configured as a PCS). The operations 900 may be complimentary to the operations 700 and/or 800 performed by the UE. For example, the operations 900 may be performed by a PCS when the PCS receives a request from the source UE to join a platoon. The source UE may perform operations 700 of FIG. 7. When the PCS forward the request to a lead UE of the platoon, the lead UE determines if such request may be approved, by performing operations 800 of FIG. 8. The PCS may relay any associated rejections or acceptance from the lead UE to the source UE, in accordance to operations 900 of FIG. 9. The interactions/communications of the source UE of the first vehicle, the lead UE of the platoon, and the PCS are further illustrated in the call flow diagram shown in FIG. 10.

The operations 900 may be implemented as software components that are executed and run on one or more processors (e.g., controller/processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 900 begin, at block 902, by receiving a request from a source UE associated with a source vehicle to join a vehicle platoon. The request indicates at least one of: an occupancy parameter of a source vehicle; an autonomy level of the source vehicle; or a travel preference parameter of the source vehicle.

Operations 900 continue at block 904 by determining, based at least on the request, a target UE associated with a target vehicle that is a member of the vehicle platoon.

At block 906, operations 900 continue by forwarding the request to the target UE.

Figure 10:
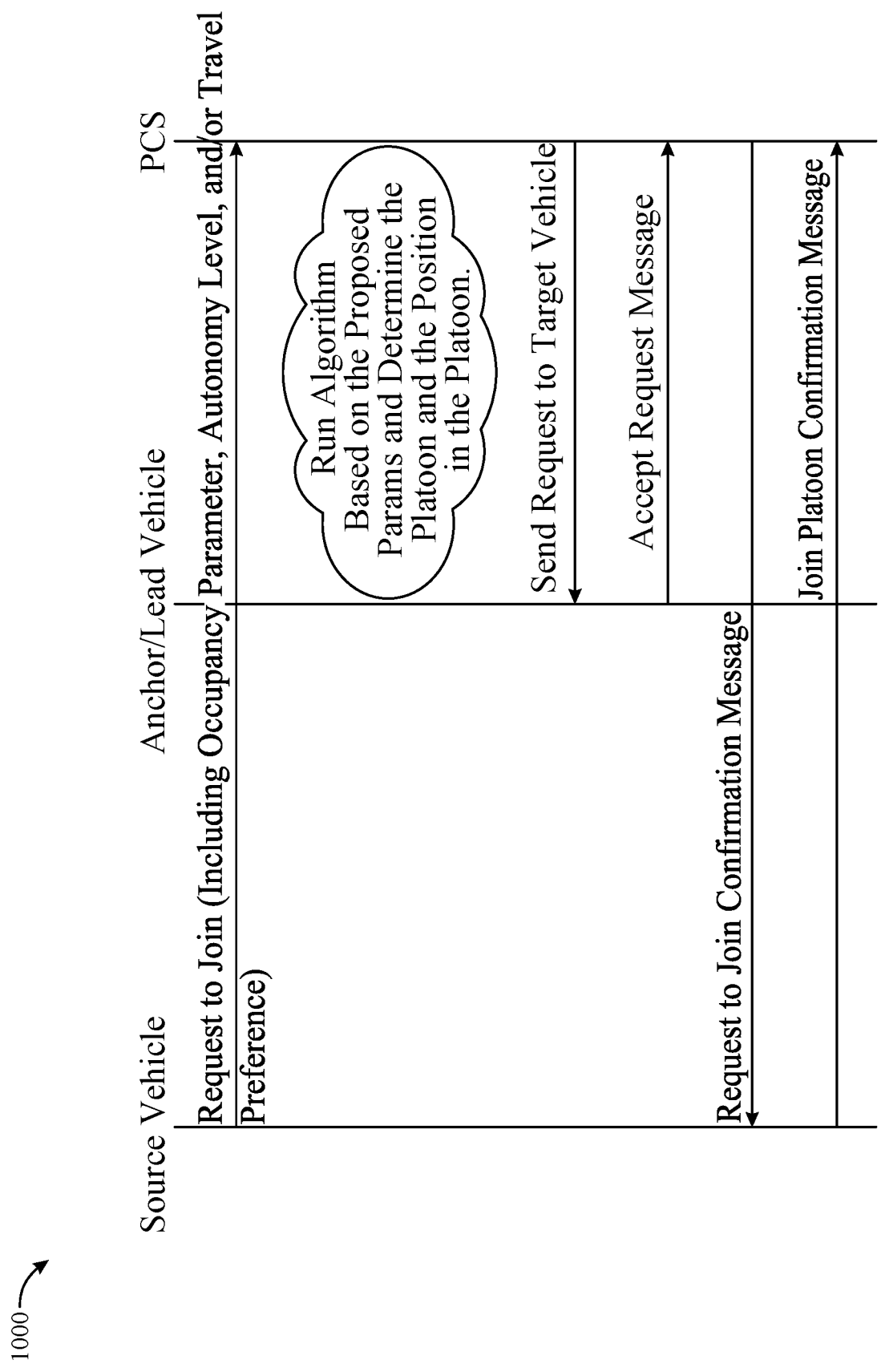
FIG. 10 illustrates a call flow diagram showing communications among the source vehicle, a lead vehicle, and a platoon control system (PCS), in accordance with certain aspects of the present disclosure.

FIG. 10 illustrates a call flow diagram 1000 showing communications among the source vehicle, a lead vehicle, and a platoon control system (PCS), in accordance with certain aspects of the present disclosure.

As shown, the source vehicle may first send a request to PCS, the request indicates at least one of an occupancy parameter of the source vehicle, an autonomy level of the source vehicle, or a travel preference parameter. The PCS executes an algorithm based on the one or more criteria or parameters in the request and determines at least one suitable or available platoon. The PCS may also determine a position of the selected platoon for accepting the source vehicle. The PCS may then send or forward the request (including the position information) to the lead vehicle of the selected platoon. The lead vehicle has the authority to decide whether to accept the request. When the lead vehicle decides that the request is accepted, the lead vehicle sends an acceptance message to the PCS, which then forwards the acceptance message (or joining confirmation message) to the source vehicle. The source vehicle may then join the selected platoon and send a confirmation message back to PCS after joining the selected platoon.

In some aspects, the occupancy parameter may include a number of passengers of the first vehicle (i.e., the source vehicle that requesting to join a platoon) associated with the source UE. The travel preference parameter may include at least one of a lane position in available lanes. Very often, there are dedicated lanes for car pools, such as high occupancy vehicle (HOV) lanes. Such dedicated lanes allow only for cars carrying two or more people for improving travel efficiency. Therefore, a platoon of vehicles may take advantage of the HOV lanes if each member vehicle of the platoon includes two or more passengers.

Using the occupancy parameter enables the first vehicle to inform the PCS to look up a suitable platoon that satisfies the car pool criteria. For example, the platoon accepting the first vehicle has vehicles that each has a same or comparable occupancy parameter as the first vehicle. As a result, an HOV platoon may be created to further enhance travel efficiency by coordinating high occupancy vehicles to travel in less congested lane(s), such as the HOV lane. In some implementations, the existing vehicles in the platoon may have an allowable deviation for the occupancy parameter as the first vehicle. For example, the occupancy parameter may be set to be between three and four, such that vehicles having both three passengers and four passengers onboard may form a platoon.

On the other hand, some autonomous or semi-autonomous vehicles may not include any passengers and are nonetheless operable to join a platoon. A vehicle platoon may prioritize vehicles with passengers over vehicles without passengers when forming a platoon. For example, fully autonomous vehicles may not carry passengers all the time. In this case a field value of '0' may indicate that the vehicle currently carries no passenger and should join a platoon that has other non-occupied vehicles. In some implementations, the vehicles that do not carry passengers may be used as a safety buffer and placed in the front of a platoon having vehicles that carry passengers.

In some aspects, a reserved value of the occupancy parameter may be used to indicate the autonomy level of the first vehicle. For example, if the first vehicle has no passenger on board, the occupancy parameter of "0" may be used to indicate the full autonomy of the first vehicle. This information can later be used in the current accident and collision avoidance algorithms where cars with passengers are prioritized over other non-passenger carrying vehicles to eliminate/minimize the number of human casualties.

In some aspects, the occupancy parameter may further include a seat position of each passenger of the first vehicle. Because the seat position often relates to a safety factor in collision, the seat position can be used to make critical decisions in order to minimize fatalities or injuries in accidents. For example, because platooning is often used in autonomous or semi-autonomous vehicles, some vehicles may not have passengers in the front row. Vehicles having passengers in the front row may need greater headways for safety concerns. Therefore, the present disclosure allows for coordinating vehicles in platoons by grouping vehicles of similar seating positions together.

In some aspects, the vehicle platoon includes vehicles having the same autonomy level as the first vehicle. The autonomy of the first vehicle can be one of: fully autonomous control, semi-autonomous control, or manual control. The autonomous level information can be used to enhance the platooning performance by minimizing the inter-vehicle distance in the platoons. For example: vehicles with fully autonomous capabilities may be grouped together. These vehicles may move in a platoon with much closer distance or lesser headways than vehicles without fully autonomous capabilities. Similarly, vehicles with semi-autonomous capability and manual vehicles may be grouped in another platoon, where the distance between the moving vehicles would be kept relatively larger to account for manual reaction time when braking or human supervision maneuvers, such as when information alert is provided in the ADAS instrument panel.

In some embodiments, a vehicle platoon may include a mix of fully autonomous and manual/semi-autonomous vehicles. The same platoon may arrange the order of the mixed vehicles such that fully autonomous vehicles are positioned in succession while maintaining a minimal distance, and the semi-autonomous/manual vehicles are separately grouped in succession while maintaining a relatively larger inter-vehicle distance. As such, the overall efficiency can be improved by minimizing the distance between the vehicles in the platoon and not compromising safety margins (e.g., allowing for sufficient headways for semi-autonomous and manual vehicles).

In some aspects, the travel preference parameter includes a preferred speed of the first vehicle. The preferred speed of the first vehicle may be selected by the driver, calculated based on time of arrival, or determined based on traffic regulation or safety concerns. The preferred speed may or may not be accepted by the platoon receiving the request. In some cases, a PCS may select, when there are more than one platoon available, a platoon that may accommodate the preferred speed and forwards the request to the lead vehicle of the selected platoon. If the selected platoon is already traveling at a speed that is similar to or the same as the preferred speed, the lead vehicle may accept the request. But if the selected platoon is traveling at a different speed, the lead vehicle may decline the request.

When the platoon declines the requested preferred speed, the first vehicle and its associated UE may receive a response message that indicates the first vehicle being allowed to join the platoon at a different speed than the preferred speed. In some cases, the source UE may decline to join the vehicle platoon at the different speed in the response message. In some cases, the source UE may negotiate yet a different speed with the platoon. For example, the source UE may indicate a credit to redeem to join the platoon at the preferred speed, such as when the credit may be sufficient to have the platoon to change the speed to the preferred speed. In some cases, other priority criteria, besides credit, may be used for negotiation. For example, vehicle type of autonomy, commercial purpose, or emergency response, may be used as priority criteria for negotiating an acceptable speed of the platoon. When the first vehicle negotiates with the platoon, the lead vehicle of the platoon may further negotiate with other member vehicles of the platoon. As part of this negotiation, the platoon may increase or decrease the speed of the platoon along with the requesting vehicle to arrive at a negotiated speed value.

Aspects of the present disclosure may provide one or more potential advantages, such as helping comply with different rules to drive vehicles on certain lanes based on car's occupancy, better accident avoidance system eliminating/minimizing the number of human casualties, enhanced platooning with minimizing the distance between the vehicles based on their capabilities, and/or inclusion of the speed of vehicle would ensure a more appropriate assignment of platoon to the incoming vehicle based on its preference.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 7, 8, and/or 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a source user equipment (UE), comprising:
transmitting a request to a base station to join a vehicle platoon, wherein the request indicates
a travel preference parameter of a first vehicle associated with the source UE, and wherein the travel preference parameter includes at least one lane position in one or more available lanes; and
receiving a response message indicating confirmation that the first vehicle is allowed to join the vehicle platoon.

2. The method of claim 1, wherein the request further indicates an occupancy parameter, and wherein the occupancy parameter includes a number of passengers of the first vehicle.

3. The method of claim 2, wherein the occupancy parameter includes a seat position of each passenger of the first vehicle.

4. The method of claim 2, wherein a reserved value of the occupancy parameter is also used to indicate an autonomy level of the first vehicle.

5. The method of claim 1, wherein the travel preference parameter indicates a lane that only allows for high occupancy vehicles.

6. The method of claim 1, wherein the vehicle platoon comprises vehicles having a same occupancy parameter as the first vehicle.

7. The method of claim 1, wherein:
the request further indicates an autonomy level of the first vehicle;
the vehicle platoon comprises vehicles having the same autonomy level as the first vehicle; and
the autonomy level of the first vehicle is one of fully autonomous control, semi-autonomous control, or manual control.

8. The method of claim 1, wherein the travel preference parameter includes a preferred speed of the first vehicle.

9. The method of claim 8, wherein the response message indicates the first vehicle is allowed to join the platoon at a different speed than the preferred speed of the first vehicle indicated in the request.

10. The method of claim 9, further comprising at least one of:
declining to join the vehicle platoon at the different speed; or
negotiating yet a different speed.

11. The method of claim 9, further indicating a credit to redeem to join the platoon at the preferred speed.

12. A method for wireless communication by a platoon user equipment (UE), comprising:
receiving a request for a source vehicle associated with a source UE to join a vehicle platoon to which a vehicle associated with the platoon UE is a member, wherein the request indicates
a travel preference parameter of the source vehicle, and wherein the travel preference parameter includes at least one lane position in one or more available lanes; and
transmitting a message indicating confirmation that the source vehicle is allowed to join the vehicle platoon.

13. The method of claim 12, wherein the request for the source vehicle is transmitted from a network entity selecting the vehicle platoon based on the request and one or more criteria.

14. The method of claim 13, wherein the vehicle platoon selected by the network entity occupies a lane reserved for high occupancy vehicles.

15. The method of claim 13, wherein the request further indicates an autonomy level of the source vehicle, and wherein the autonomy level signifies a level of human intervention required for operation of the source vehicle.

16. The method of claim 15, wherein the vehicle platoon includes vehicles sharing a common autonomy level as the autonomy level of the source vehicle.

17. The method of claim 16, wherein the common autonomy level results in a closer allowable distance between vehicles than an allowable distance for lower autonomy levels.

18. The method of claim 17, further comprising adjusting the allowable distance between vehicles based on the autonomy level of the source vehicle and autonomy levels of vehicles in the vehicle platoon for improving efficiency.

19. The method of claim 12, wherein the request further indicates an occupancy parameter, and wherein the occupancy parameter includes a number of passengers of the source vehicle.

20. The method of claim 15, wherein the occupancy parameter includes a seat position of each passenger of the source vehicle.

21. The method of claim 20, further comprising executing, at the platoon UE or a network entity, an accident and collision avoidance algorithm where vehicles are prioritized based on at least one of the number of passengers or the seat position of each passenger.

22. The method of claim 19, wherein a reserved value of the occupancy parameter is also used to indicate an autonomy level of the source vehicle.

23. The method of claim 19, wherein the vehicle platoon prioritizes vehicles with passengers over vehicles with no passengers.

24. The method of claim 12, wherein the travel preference parameter includes a preferred speed of the source vehicle and the vehicle platoon of the platoon UE has been selected based on the preferred speed.

25. The method of claim 24, further comprising adjusting an overall speed of the vehicle platoon in response to the preferred speed of the source vehicle (1) based on a priority type of the source vehicle, or (2) in exchange for offered credit from the source vehicle.

26. The method of claim 25, wherein adjusting the overall speed of the vehicle platoon comprises negotiating speed changes with one or more vehicles in the vehicle platoon.

27. A method for wireless communication by a network entity, comprising:
receiving a request from a source UE associated with a source vehicle to join a vehicle platoon, wherein the request indicates
a travel preference parameter of the source vehicle, and wherein the travel preference parameter includes at least one lane position in one or more available lanes; and
selecting, based at least on information in the request, a platoon suitable for the source UE; and
forwarding the request to a target UE of the selected platoon.

28. The method of claim 27, wherein:
the request further indicates an occupancy parameter of the source vehicle;
the occupancy parameter of the source vehicle includes a number of passengers of the source vehicle; and
selecting the platoon comprises identifying a platoon having an average number of passengers per vehicle closest to the number of passengers of the source vehicle.

29. The method of claim 28, wherein the number of passengers is at least two and the selected platoon occupies a lane for high occupancy vehicles.

30. The method of claim 28, further comprising using the occupancy parameter in an accident and collision avoidance algorithm to minimize injuries in accident simulations.

31. The method of claim 30, further comprising prioritizing vehicles with passengers over vehicles not carrying passengers.

32. The method of claim 31, wherein the occupancy parameter further includes an indication of a seating position of each passenger of the source vehicle.

33. The method of claim 27, wherein the request further indicates an autonomy level of the source vehicle, and wherein the autonomy level signifies a level of human intervention required for operation of the source vehicle.

34. The method of claim 33, wherein the selected platoon includes vehicles sharing a common autonomy level as the autonomy level of the source vehicle.

35. The method of claim 34, wherein the common autonomy level results in a closer allowable distance between vehicles than an allowable distance for lower autonomy levels.

36. The method of claim 35, further comprising requesting the target UE of the selected platoon to adjust the allowable distance between vehicles based on the autonomy level of the source vehicle and autonomy levels of vehicles in the platoon for improving efficiency.

37. The method of claim 27, wherein the travel preference parameter includes a preferred speed of the source vehicle and wherein selecting the platoon is based on the preferred speed.

38. The method of claim 37, wherein selecting the platoon comprises selecting a platoon having an overall speed closest to the preferred speed of the source vehicle.

39. The method of claim 37, further comprising requesting the target UE of the selected platoon to adjust an overall speed of the platoon in view of the preferred speed of the source vehicle (1) based on a priority type of the source vehicle, or (2) in exchange for offered credit from the source vehicle.

40. The method of claim 39, further comprising receiving an acceptance from the target UE to allow the source vehicle to join the selected platoon.

41. The method of claim 40, wherein the acceptance from the target UE comprises adjusting the overall speed of the platoon by negotiating speed changes with one or more vehicles in the platoon.

42. The method of claim 40, further comprising sending a confirmation to the source vehicle and receiving a notification from the source vehicle when the source vehicle has completed joining the platoon.

43. The method of claim 39, further comprising receiving a denial from the target UE and selecting a different platoon for the source vehicle.

* * * * *